United States Patent
Smirnov et al.

(10) Patent No.: US 11,683,576 B2
(45) Date of Patent: Jun. 20, 2023

(54) CAMERA MODULE

(71) Applicant: SAMSUNG ELECTRO-MECHANICS CO., LTD., Suwon-si (KR)

(72) Inventors: Viatcheslav Smirnov, Suwon-si (KR); Jong Won Song, Suwon-si (KR); Young An Choi, Suwon-si (KR); Tae Young Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/376,316

(22) Filed: Jul. 15, 2021

(65) Prior Publication Data

US 2022/0159158 A1 May 19, 2022

(30) Foreign Application Priority Data

Nov. 16, 2020 (KR) .................. 10-2020-0152845

(51) Int. Cl.
*H04N 23/57* (2023.01)
*G02B 7/02* (2021.01)
*H04N 23/52* (2023.01)

(52) U.S. Cl.
CPC ............. *H04N 23/57* (2023.01); *G02B 7/021* (2013.01); *G02B 7/028* (2013.01); *H04N 23/52* (2023.01)

(58) Field of Classification Search
CPC ............. H04N 5/2257; H04N 5/22521; H04N 5/2252; H04N 23/57; H04N 23/52; H04N 23/55; G02B 7/021; G02B 7/028; G02B 7/008; G02B 13/16; G03B 17/55; G03B 30/00
See application file for complete search history.

(56) References Cited

U.S. PATENT DOCUMENTS

| | | | | |
|---|---|---|---|---|
| 7,965,336 B2* | 6/2011 | Bingle | ................... | G03B 17/02 348/149 |
| 2004/0169771 A1* | 9/2004 | Washington | ........... | H04N 23/52 348/E5.025 |
| 2009/0315133 A1* | 12/2009 | Chang | ............... | H01L 27/14618 257/E27.001 |
| 2013/0077257 A1 | 3/2013 | Tsai | | |

(Continued)

FOREIGN PATENT DOCUMENTS

| | | | | |
|---|---|---|---|---|
| CN | 110333640 A | * | 10/2019 | ............. G03B 17/12 |
| JP | 2007-295166 A | | 11/2007 | |

(Continued)

OTHER PUBLICATIONS

Korean Office Action issued dated Jan. 14, 2022, in counterpart Korean Patent Application No. 10-2020-0152845 (8 pages in English and 6 pages in Korean).

*Primary Examiner* — Chiawei Chen
(74) *Attorney, Agent, or Firm* — NSIP Law (57) ABSTRACT

A camera module includes a lens barrel configured to receive a lens, a substrate on which an image sensor is disposed, a housing configured to receive the lens barrel and to contact the substrate, a heat transfer member configured to contact the housing, and a heat dissipation member configured to contact the heat transfer member and dissipate heat from the heat transfer member in different lateral directions about the lens.

19 Claims, 9 Drawing Sheets

(56) References Cited

U.S. PATENT DOCUMENTS

| | | | |
|---|---|---|---|
| 2013/0093947 A1* | 4/2013 | Lee | H04N 23/56 348/E5.026 |
| 2014/0184835 A1* | 7/2014 | Nozawa | H04N 5/2252 348/208.3 |
| 2014/0320657 A1 | 10/2014 | Han et al. | |
| 2015/0358564 A1* | 12/2015 | Kang | H01L 23/36 348/244 |
| 2015/0365569 A1* | 12/2015 | Mai | H04N 5/2252 348/373 |
| 2016/0104451 A1* | 4/2016 | Sahin | G09G 3/002 345/519 |
| 2017/0195531 A1* | 7/2017 | Warren | H05K 7/20509 |
| 2018/0172900 A1* | 6/2018 | Ahn | G02B 6/0085 |
| 2018/0188636 A1 | 7/2018 | Kim | |
| 2019/0121157 A1* | 4/2019 | Chan | G03B 5/04 |
| 2019/0306966 A1* | 10/2019 | Byrne | H05K 1/0203 |
| 2020/0089084 A1* | 3/2020 | Chen | G03B 17/02 |
| 2020/0344395 A1* | 10/2020 | Guo | H04N 5/22521 |
| 2021/0063244 A1* | 3/2021 | Parrish | G01J 5/10 |
| 2021/0136269 A1* | 5/2021 | Katayama | B60R 11/04 |
| 2022/0124234 A1* | 4/2022 | Kawai | H04N 5/22521 |

FOREIGN PATENT DOCUMENTS

| | | |
|---|---|---|
| JP | 2008-306303 A | 12/2008 |
| JP | 2014-187502 A | 10/2014 |
| JP | 2016-1270 A | 1/2016 |
| JP | 2017-513070 A | 5/2017 |
| KR | 10-1505071 B1 | 3/2015 |
| KR | 10-2017-0004053 A | 1/2017 |
| WO | WO 2015/132391 A2 | 9/2015 |

* cited by examiner

CAMERA MODULE

CROSS-REFERENCE TO RELATED APPLICATIONS

This application claims the benefit under 35 USC 119(a) of Korean Patent Application No. 10-2020-0152845 filed on Nov. 16, 2020, in the Korean Intellectual Property Office, the entire disclosure of which is incorporated herein by reference for all purposes.

BACKGROUND

1. Field

The following description relates to a camera module configured to dissipate heat generated therein from the inside to the outside.

2. Description of the Background

Camera modules include lens units and optical signal conversion units. Such a lens unit may include one or more lenses, and may be configured to refract light reflected from a subject to enable the light to enter the optical signal conversion unit. The optical signal conversion unit includes a plurality of optical sensors, and is configured to convert an optical signal incident through the lens unit into an electric signal.

As the range of use of camera modules is increased and the function of camera modules is expanded, demand for a camera module having high resolution is increasing. To implement a high-resolution camera module, an optical signal conversion unit (e.g., an image sensor) capable of high-speed processing of an optical signal and other electronic components (e.g., a passive device) are required. However, since the optical signal conversion unit generates a considerable amount of heat in the process of processing the optical signal at high speed, there is a problem of deteriorating the lifespan and performance of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel configured to receive a lens, a substrate on which an image sensor is disposed, a housing configured to receive the lens barrel and to contact the substrate, a heat transfer member configured to contact the housing, and a heat dissipation member configured to contact the heat transfer member and dissipate heat from the heat transfer member in different lateral directions about the lens.

The housing may include a heat dissipation unit configured to be in surface contact with the heat transfer member.

The heat dissipation member may be configured to radiate heat in a direction of an optical axis of the lens and a direction perpendicular to the optical axis.

The heat dissipation member may include a first heat dissipation member extending in a length direction of the housing, and a second heat dissipation member extending in a length direction of the substrate.

The camera module may further include a heat insulating member disposed between the substrate and the second heat dissipation member.

The heat dissipation member may include a first heat dissipation member disposed on a first side of the housing, and a second heat dissipation member disposed on a second side of the housing.

The heat dissipation member may include a first heat dissipation member disposed on a first side of the housing, a second heat dissipation member disposed on a second side of the housing, and a third heat dissipation member disposed on a third side of the housing.

The heat dissipation member may include one or more heat dissipation fins to increase a heat dissipation cross-sectional area.

The heat transfer member may include a thermoelectric element.

In another general aspect, a camera module includes a substrate on which an image sensor is disposed, a lens barrel configured to receive a lens, a housing configured to receive the lens barrel, a first heat transfer member configured to contact the substrate, a second heat transfer member configured to contact the housing, and a first heat dissipation member and a second heat dissipation member configured to contact the first heat transfer member and the second heat transfer member, respectively, and configured to dissipate heat from the first heat transfer member and the second heat transfer member.

The first heat dissipation member and the second heat dissipation member may be integrally provided.

At least one of the first heat transfer member and the second heat transfer member may be comprised of a thermoelectric element.

In another general aspect, a camera module includes a lens barrel configured to receive a lens, a substrate on which an image sensor is disposed, a housing configured to receive the lens barrel and in contact with the substrate, a heat transfer member disposed in contact with the housing, and a heat dissipation member in contact with the heat transfer member, disposed on at least one side surface of the housing, and configured to dissipate heat from the heat transfer member.

The camera module may further include a heat dissipation unit disposed between the housing and the heat transfer member and in contact with the housing and the heat transfer member.

The heat dissipation member may include a first heat dissipation member extending in a first direction from the housing, and a second heat dissipation member extending in a second direction from the housing.

The first direction and the second direction may be different from each other.

The first direction or the second direction may be in an optical axis direction of the lens.

The first and second heat dissipation members may have first and second fins, respectively, extending away from the housing, and the first and second fins may be substantially parallel or substantially perpendicular to each other.

The first and second heat dissipation members may be integral with each other or separate from each other.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

An aspect of the present disclosure is to provide a camera module configured to prevent the phenomenon of resolution deterioration due to overheating of an optical signal conversion unit and an electronic component.

The camera module described herein may be mounted on a device configured to observe or monitor the surrounding environment. For example, the camera module may be mounted on a security monitoring device, a vehicle speed detection device, or the like. However, the range of use of the camera module is not limited to the above-described devices. For example, the camera module may be mounted on a vehicle having a front and rear collision avoidance function, a vehicle having an autonomous driving function, or the like.

The camera module includes a lens barrel, and a substrate on which an image sensor is mounted. The lens barrel is configured to receive one or more lenses. For example, the lens barrel may be configured to accommodate four or more lenses. However, the number of lenses accommodated in the lens barrel is not limited to four. For example, the lens barrel may accommodate 3 or less or 5 or more lenses. The substrate may be provided with electronic components in addition to the image sensor. For example, a passive element electrically connected to the image sensor may be mounted inside or on one side of the substrate.

The camera module includes a housing configured to receive at least one of a lens barrel and a substrate. The housing may be configured to transfer heat of the substrate externally. For example, the housing according to an example may be in contact with the substrate to absorb or transfer heat from the substrate.

The camera module may generate heat. For example, a substrate of a camera module, in detail, an image sensor, may generate considerable heat in the process of converting an optical signal into an electrical signal. Heat generated inside of the camera module overheats the substrate and electronic components mounted on the substrate, and may cause malfunctioning of the camera module and deterioration of a resolution. The present disclosure is to prevent the above-described problem, and provides a camera module configured to discharge heat generated in the inside thereof externally.

For example, a camera module according to an example may dissipate heat from a substrate externally through a heat transfer member and a heat dissipation member. The heat transfer member is disposed to contact a housing. For example, the heat transfer member may be in surface contact with one surface of the housing in a substantial size to absorb heat of the substrate transferred to the housing or to transfer the heat to a heat dissipation member. The heat dissipation member contacts the heat transfer member and is configured to dissipate heat of the heat transfer member to a plurality of sides. For example, the heat dissipation member may be disposed on a side of the housing to externally discharge heat transferred through the heat transfer member. Therefore, since the camera module according to this example heats the housing to a predetermined temperature using heat generated by the substrate and simultaneously discharges the heat externally, an overheating phenomenon of the substrate may be suppressed while maintaining the constant optical performance of the camera module.

Hereinafter, examples will be described in detail on the basis of the accompanying drawings.

Figure 1:
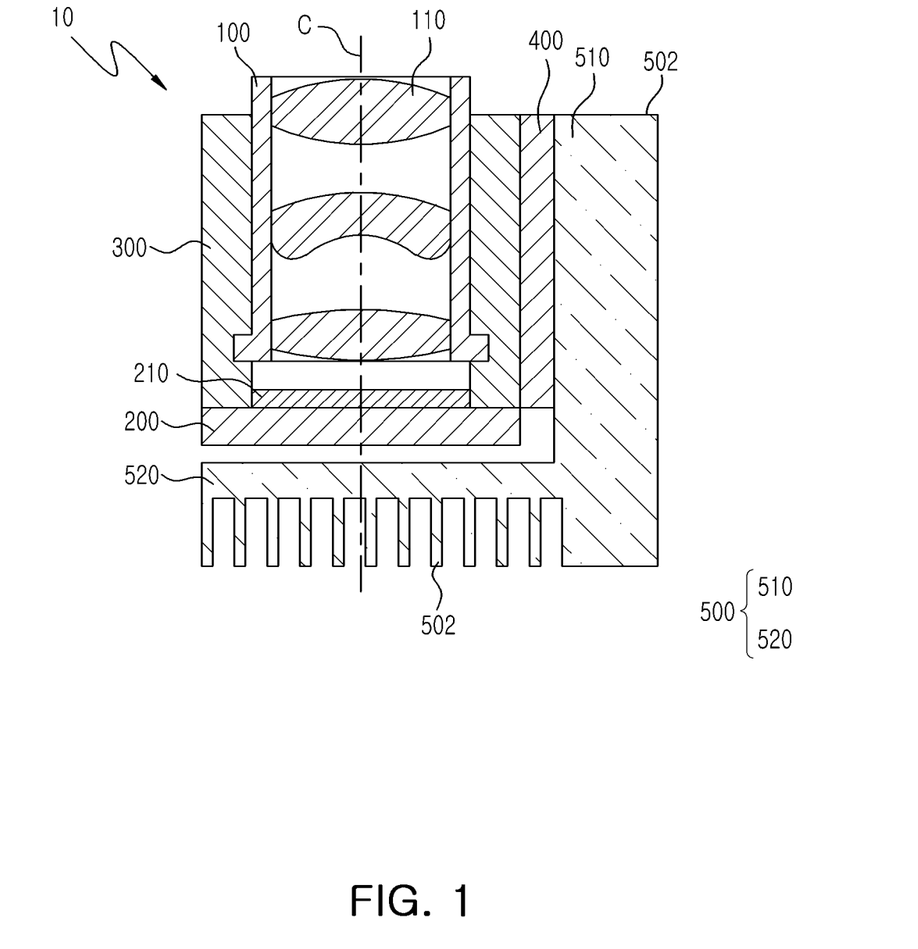
FIG. 1 is a cross-sectional view of a camera module according to an example.
Figure 2:
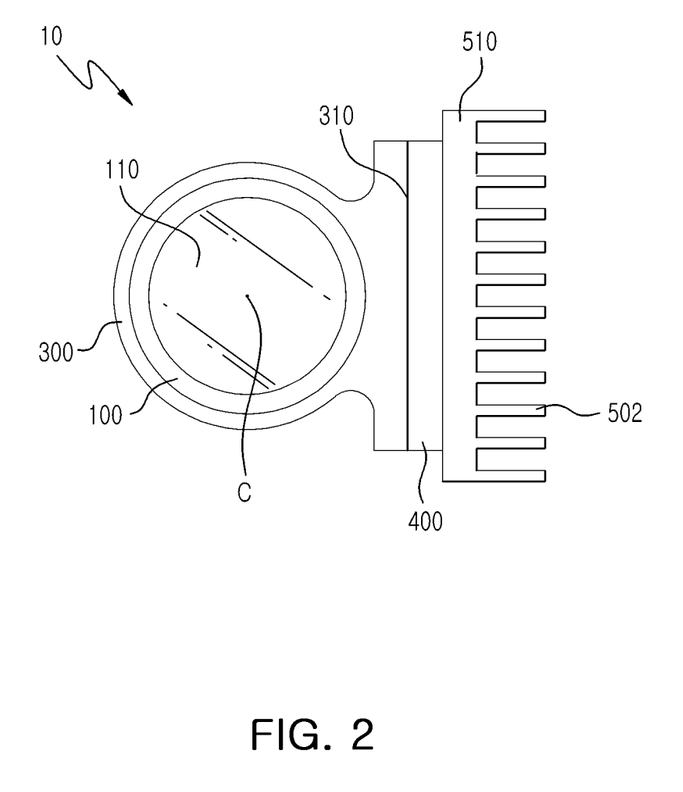
FIG. 2 is a plan view of the camera module illustrated in FIG. 1.

First, a camera module according to an example will be described with reference to FIGS. 1 and 2.

A camera module 10 according to an example includes a lens barrel 100, a substrate 200, a housing 300, a heat transfer member 400, and a heat dissipation member 500. However, the configuration of the camera module 10 is not limited to the aforementioned members. For example, the camera module 10 may further include a shield can for protecting the lens barrel 100 and the substrate 200 from harmful electromagnetic waves or external impacts, and the like. In addition, the camera module 10 may further include an airtight member to block penetration of moisture.

The lens barrel 100 is configured to receive a lens 110. For example, the lens barrel 100 may accommodate one or more lenses 110 therein. The lens barrel 100 may be configured to significantly reduce deformation due to heat. For example, the lens barrel 100 may be formed of a thermosetting plastic material. However, the material of the lens barrel 100 is not limited to plastic. For example, the lens barrel 100 may be formed of a metal material.

The lens 110 is disposed inside of the lens barrel 100. For example, one or more lenses 110 may be sequentially disposed inside of the lens barrel 100 in an optical axis (C) direction. The lens 110 is configured to refract light. For example, the lens 110 may have a convex or concave shape on one surface to converge or diverge incident light. The lens 110 may be formed of a plastic material to reduce the weight of the camera module 10. However, not all lenses 110 constituting the camera module 10 are formed of a plastic material. For example, one or more lenses 110 may be formed of a glass material to significantly reduce changes in optical characteristics according to temperature changes.

The substrate 200 provides a mounting space for electronic components required for driving the camera module 10. For example, an image sensor 210 may be mounted on one surface of the substrate 200. The image sensor 210 may be configured to convert an optical signal incident through the lens 110 into an electric signal. The substrate 200 may further include electronic components required for driving the image sensor 210. For example, a passive element may be disposed on one surface or inside of the substrate 200. The substrate 200 may be configured to enable electrical connection between electronic components. For example, a circuit electrically connecting the image sensor 210 and the passive element may be formed on one surface or inside of the substrate 200.

The housing 300 is configured to accommodate at least one of the lens barrel 100 and the substrate 200. For example, the housing 300 may accommodate a lens barrel therein. The housing 300 may be configured to absorb or transfer externally heat generated by the substrate 200. For example, the housing 300 may contact at least one surface of the substrate 200 to absorb heat generated by the substrate 200 and/or the image sensor 210 and/or transfer the heat to another member. The housing 300 may be formed of a material having relatively high thermal conductivity to enable heat transfer. For example, the housing 300 may be formed of a metal material. However, the material of the housing 300 is not limited to metal. One side of the housing 300 may be formed to facilitate surface contact with other members. For example, a heat dissipation unit 310 formed substantially flat may be formed on one side of the housing 300. The heat dissipation unit 310 may be elongated in the optical axis C direction and a direction intersecting the optical axis C. However, the surface of the heat dissipation unit 310 is not necessarily formed to be flat. For example, to increase the surface area of the heat dissipation unit 310, the surface of the heat dissipation unit 310 may be formed to be corrugated.

The heat transfer member 400 is configured to contact the housing 300. For example, the heat transfer member 400 may be disposed to contact the heat dissipation unit 310 of the housing 300. The heat transfer member 400 may be fixed to the heat dissipation unit 310. For example, the heat transfer member 400 may be firmly fixed to the heat dissipation unit 310 by an adhesive. The adhesive may be configured to allow heat transfer. For example, the adhesive may include a material having relatively high thermal conductivity. As a detailed example, the adhesive may include a metal powder having high thermal conductivity or the like. However, the coupling means between the heat transfer member 400 and the heat dissipation unit 310 of the housing 300 is not limited to an adhesive. For example, the heat transfer member 400 and the heat dissipation unit 310 may be combined in a physical form such as a protrusion and a groove.

The heat transfer member 400 may be formed of a material having relatively high thermoelectricity. For example, the heat transfer member 400 may be formed of copper, aluminum, an alloy of copper and aluminum, or the like. However, the material of the heat transfer member 400 is not limited to the aforementioned materials. For example, the heat transfer member 400 may be formed of a thermoelectric element.

The heat dissipation member 500 is configured to transfer heat of the heat transfer member 400 externally. For example, the heat dissipation member 500 may absorb heat of the heat transfer member 400 and discharge the heat into the air. The heat dissipation member 500 may be configured to facilitate heat dissipation. For example, the heat dissipation member 500 may be formed of a metal material. In addition, the heat dissipation member 500 may include a plurality of heat dissipation fins 502 to increase a surface area in contact with the atmosphere.

The heat dissipation member 500 may dissipate heat from the heat transfer member 400 in different lateral directions about the lens 110. For example, the heat dissipation member 500 may include a first heat dissipation member 510 configured to dissipate heat in a direction intersecting the optical axis C and a second heat dissipation member 520 configured to dissipate heat in the optical axis C direction. The first heat dissipation member 510 extends in a length direction of the housing 300, and the second heat dissipation member 520 extends in a length direction of the substrate 200.

Figure 3:
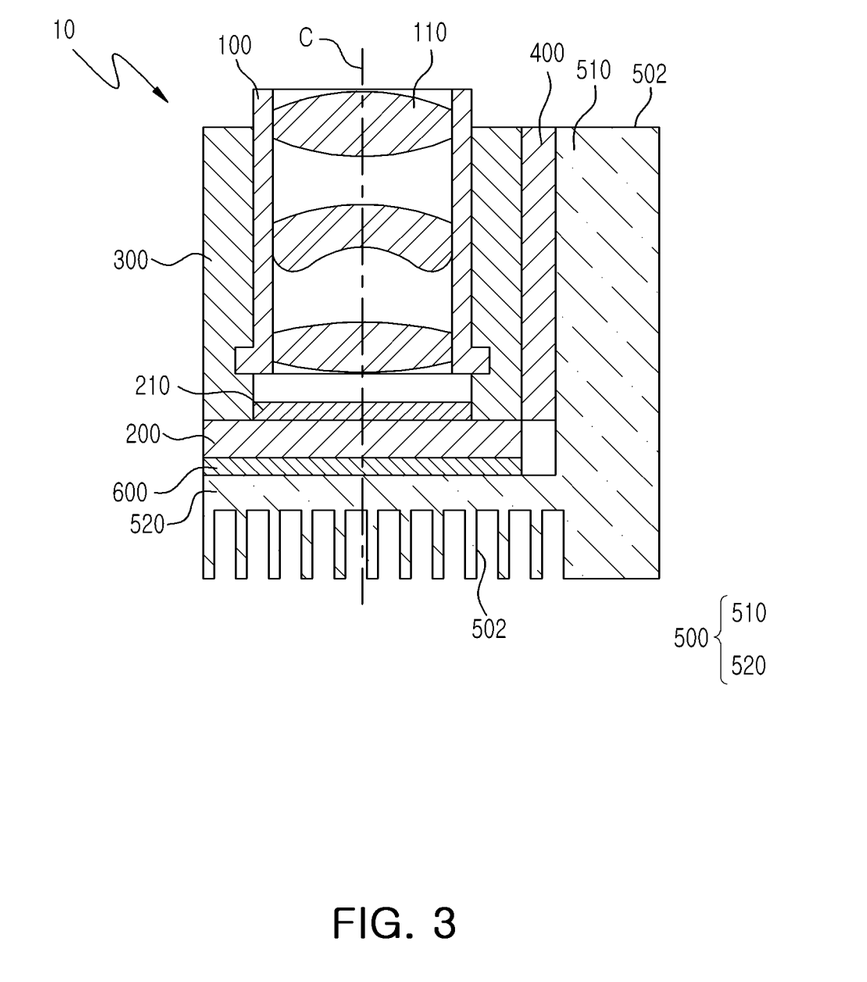
FIG. 3 is a cross-sectional view according to a modified form of the camera module illustrated in FIG. 1.

The camera module 10 according to this example may further include a configuration for blocking heat from the second heat dissipation member 520 from being transferred to the substrate 200. For example, the camera module 10 may further include a heat insulating member 600 disposed between the substrate 200 and the second heat dissipation member 520 as illustrated in FIG. 3. The heat insulating member 600 may be adhered to the substrate 200 or the second heat dissipation member 520. However, the heat insulating member 600 is not necessarily adhered to or contacted with the substrate 200 and the second heat dissipation member 520. For example, the heat insulating member 600 may be disposed in contact with the substrate 200 and spaced apart from the second heat dissipation member 520.

The camera module 10 configured as above may radiate heat generated by the substrate 200 and the image sensor 210 externally or into the atmosphere through the housing 300, the heat transfer member 400, and the heat dissipation member 500. Therefore, the problem of performance degradation of the camera module 10 due to overheating may be reduced.

In addition, since the camera module 10 according to this example may heat the lens barrel 100 to a substantially constant temperature by the housing 300, a change in optical performance of the lens 110 due to temperature change may be suppressed.

Figure 4:
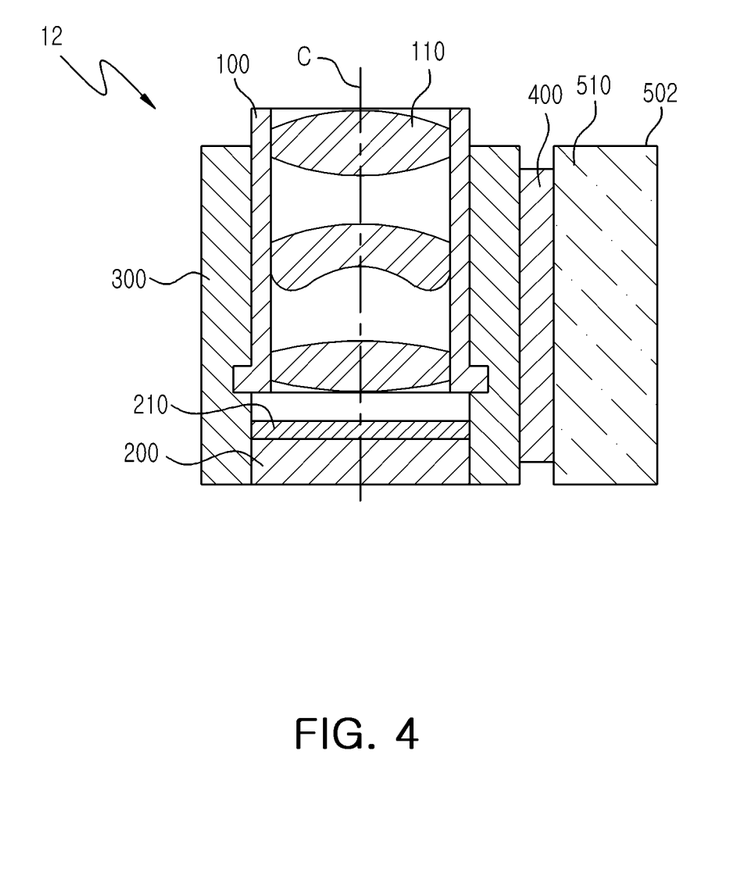
FIG. 4 is a cross-sectional view of a camera module according to another example.
Figure 5:
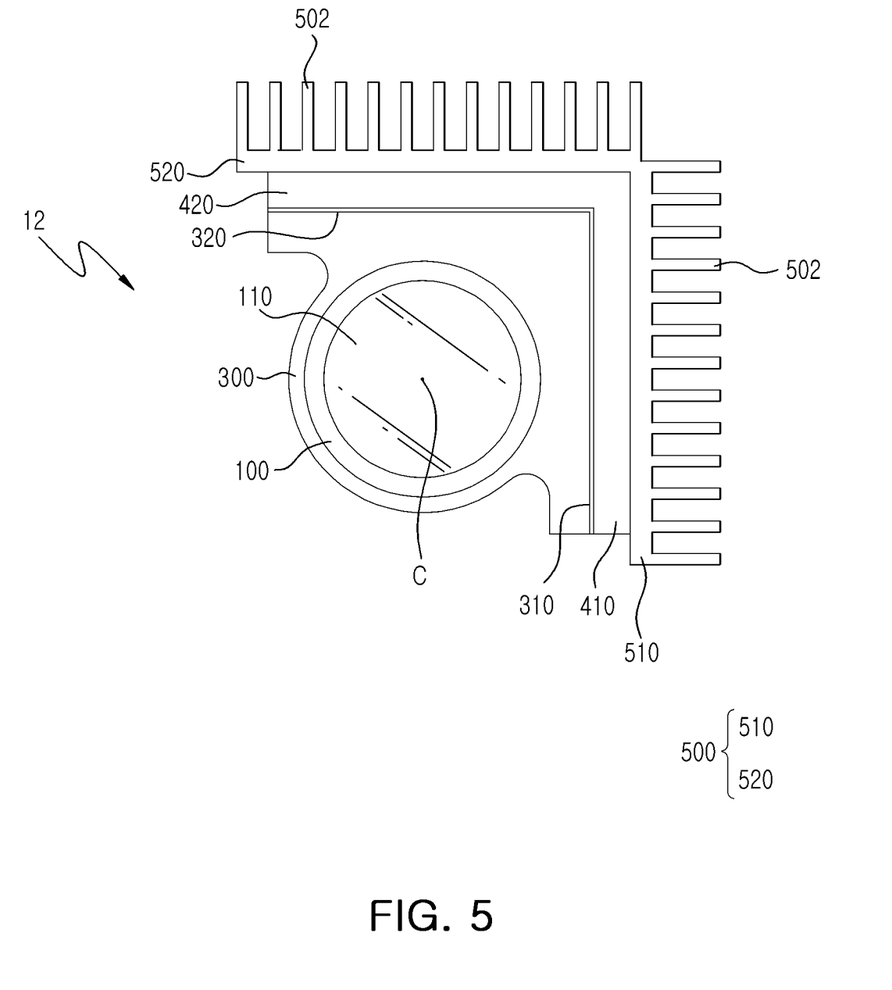
FIG. 5 is a plan view of the camera module illustrated in FIG. 4.

Next, a camera module according to another example will be described with reference to FIGS. 4 to 6.

A camera module 12 according to an example includes a lens barrel 100, a substrate 200, a housing 300, a heat transfer member 400, and a heat dissipation member 500. However, the configuration of the camera module 12 is not limited to the aforementioned members. For example, the camera module 12 may further include a shield can for protecting the lens barrel 100 and the substrate 200 from harmful electromagnetic waves or external impacts. In addition, the camera module 12 may further include an airtight member for blocking penetration of moisture.

The lens barrel 100 is configured to receive a lens 110. For example, the lens barrel 100 may accommodate one or more lenses 110 therein. The lens barrel 100 may be configured to significantly reduce deformation thereof due to heat. For example, the lens barrel 100 may be formed of a thermosetting plastic material. However, the material of the lens barrel 100 is not limited to plastic. For example, the lens barrel 100 may also be formed of a metal material.

The lens 110 is disposed inside of the lens barrel 100. For example, one or more lenses 110 may be sequentially disposed inside of the lens barrel 100 in the optical axis (C) direction. The lens 110 is configured to refract light. For example, the lens 110 may have a convex or concave shape on one surface to converge or diverge incident light. The lens 110 may be formed of a plastic material to reduce the weight of the camera module 12. However, not all lenses 110 constituting the camera module 12 are formed of a plastic material. For example, one or more lenses 110 may be formed of a glass material to significantly reduce changes in optical characteristics according to temperature changes.

The substrate 200 provides a mounting space for electronic components required for driving the camera module 12. For example, an image sensor 210 may be mounted on one surface of the substrate 200. The image sensor 210 may be configured to convert an optical signal incident through the lens 110 into an electric signal. The substrate 200 may further include electronic components required to drive the image sensor 210. For example, a passive element may be disposed on one surface or inside of the substrate 200. The substrate 200 may be configured to enable electrical connection between electronic components. For example, a circuit for electrically connecting the image sensor 210 and the passive element may be formed on one surface or inside of the substrate 200.

The housing 300 is configured to accommodate at least one of the lens barrel 100 and the substrate 200. For example, the housing 300 may accommodate a lens barrel therein. The housing 300 may be configured to absorb heat generated by the substrate 200 or transfer the heat externally. For example, the housing 300 may contact at least one surface of the substrate 200 to absorb heat generated by the substrate 200 or the image sensor 210 or transfer the heat to another member. The housing 300 may be formed of a material having high thermal conductivity to enable heat transfer. For example, the housing 300 may be formed of a metal material. However, the material of the housing 300 is not limited to metal. One or more side surfaces of the housing 300 may be formed to facilitate surface contact with one or more heat transfer members 400 (410, 420). For example, a first heat dissipation unit 310 and a second heat dissipation unit 320 formed to be substantially flat may be formed on a first side and a second side of the housing 300, respectively. The heat dissipation units 310 and 320 may be elongated in the optical axis C direction and a direction intersecting the optical axis C. However, the surfaces of the heat dissipation units 310 and 320 are not necessarily formed flat. For example, to increase the surface area of the heat dissipation units 310 and 320, the surfaces of the heat dissipation units 310 and 320 may be formed to be corrugated.

The heat transfer members 400 (410, 420) are configured to contact the housing 300. For example, a first heat transfer member 410 may be disposed to contact the first heat dissipation unit 310 of the housing 300, and a second heat transfer member 420 may be disposed to contact the second heat dissipation unit 320 of the housing 300. The first heat transfer member 410 and the second heat transfer member 420 may be firmly fixed to the first heat dissipation unit 310 and the second heat dissipation unit 320 by an adhesive. The adhesive may be configured to allow heat transfer. For example, the adhesive may include a material having high thermal conductivity. As a detailed example, the adhesive may include a metal powder having high thermal conductivity. However, the coupling means between the heat transfer members 410 and 420 and the heat dissipation units 310 and 320 is not limited to an adhesive. For example, the heat transfer members 410 and 420 and the heat dissipation units 310 and 320 may be combined in a physical form such as a protrusion and a groove.

The heat transfer members 400 (410, 420) may be formed of a material having relatively high thermoelectricity. For example, the heat transfer members 400 (410, 420) may be formed of copper, aluminum, an alloy of copper and aluminum, or the like. However, the material of the heat transfer members 400 (410, 420) is not limited to the above-described materials.

The heat dissipation member 500 is configured to transmit heat of the heat transfer members 400 (410, 420) externally. For example, the heat dissipation member 500 may absorb heat of the one or more heat transfer members 400 and discharge the heat into the air. The heat dissipation member 500 may be configured to facilitate heat dissipation. For example, the heat dissipation member 500 may be formed of a metal material. In addition, the heat dissipation member 500 may include a plurality of heat dissipation fins 502 to increase a surface area in contact with the atmosphere.

The heat dissipation member 500 may dissipate heat from the heat transfer members 400 (410 and 420) in different lateral directions centering on the lens 110. The heat dissipation member 500 may be divided into a first heat dissipation member 510 and a second heat dissipation member 520 based on a main radiating direction. The first heat dissipation member 510 may be disposed on a first side of the housing 300 to contact the first heat transfer member 410, and the second heat dissipation member 520 may be disposed on a second side of the housing 300 to contact the second heat transfer member 420.

The first heat dissipation member 510 may be configured to dissipate heat from the first heat transfer member 410 to one side of the camera module 12. The second heat dissipation member 520 may be configured to dissipate heat from the second heat transfer member 420 to an other side of the camera module 12. The first heat dissipation member 510 and the second heat dissipation member 520 may be integrally formed. However, the first heat dissipation member 510 and the second heat dissipation member 520 are not necessarily integrally formed. For example, the first heat dissipation member 510 and the second heat dissipation member 520 may also be formed to be separated from each other.

Figure 6:
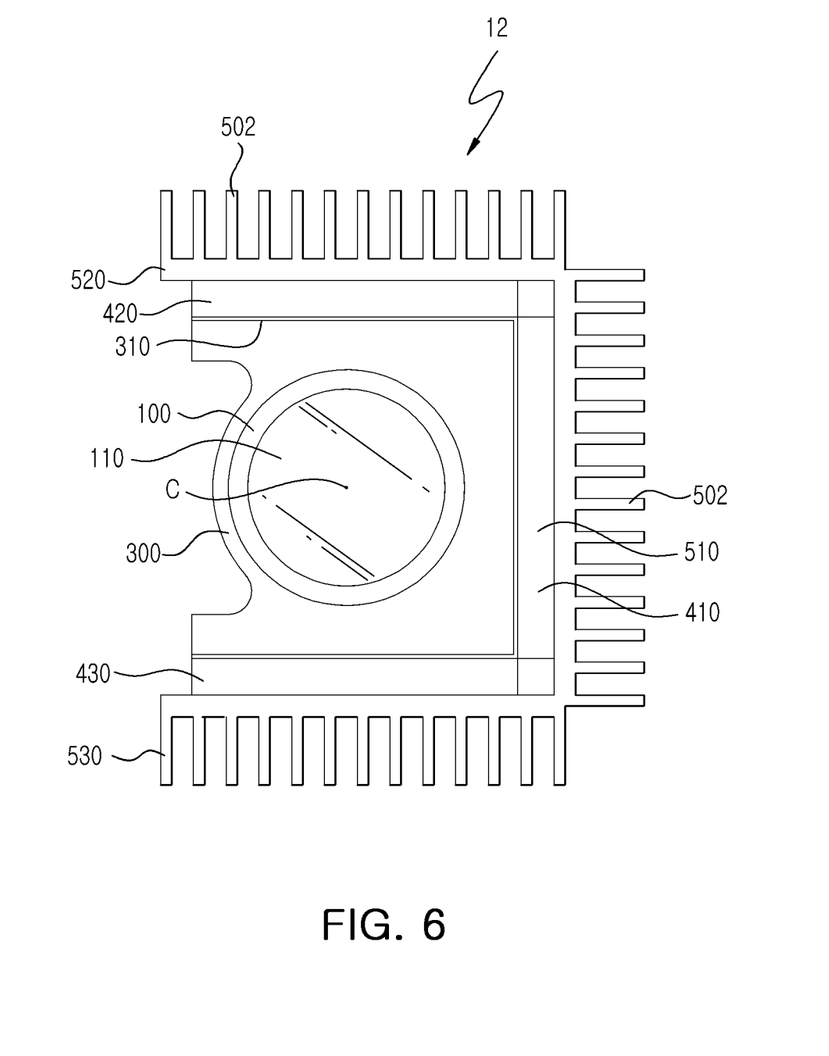
FIG. 6 is a plan view according to another form of the camera module illustrated in FIG. 4.

On the other hand, the heat dissipation member 500 may be configured to dissipate heat to three sides of the housing 300 as illustrated in FIG. 6. For example, the heat dissipation member 500 may include a first heat dissipation member 510 disposed on a first side of the housing 300, a second heat dissipation member 520 disposed on a second side of the housing 300, and a third heat dissipation member 530 disposed on a third side of the housing 300. The first heat dissipation member 510 to the third heat dissipation member 530 are bonded to the first heat transfer member 410 to the third heat transfer member 430 disposed on the first side to the third side of the housing 30, respectively.

In the camera module 12 configured as above, heat generated by the substrate 200 and the image sensor 210 may be quickly released externally or into the atmosphere through the housing 300, the plurality of heat transfer members 410, 420, and 430, and the plurality of heat dissipation members 510, 520, and 530.

Figure 7:
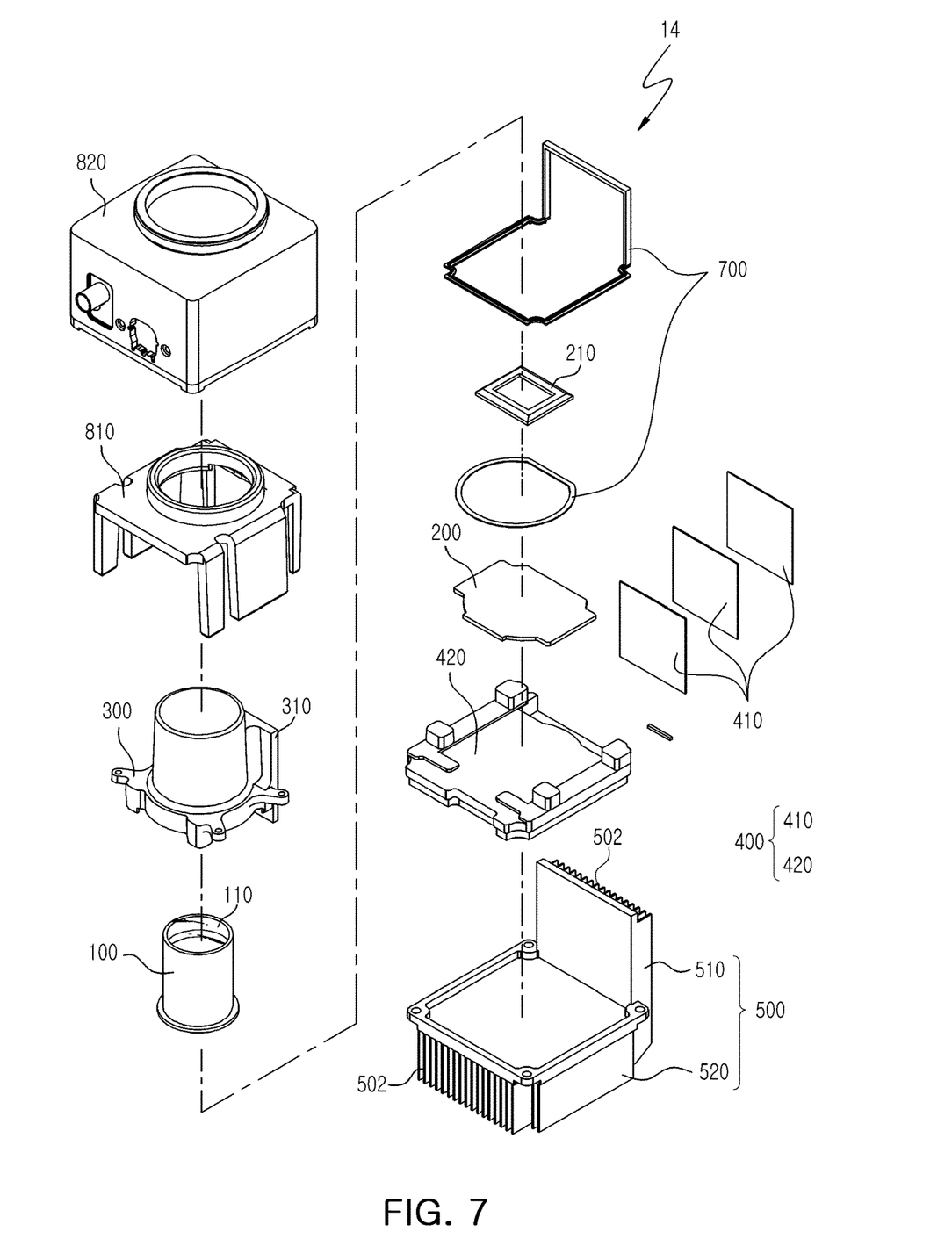
FIG. 7 is an exploded perspective view of a camera module according to another example.
Figure 8:
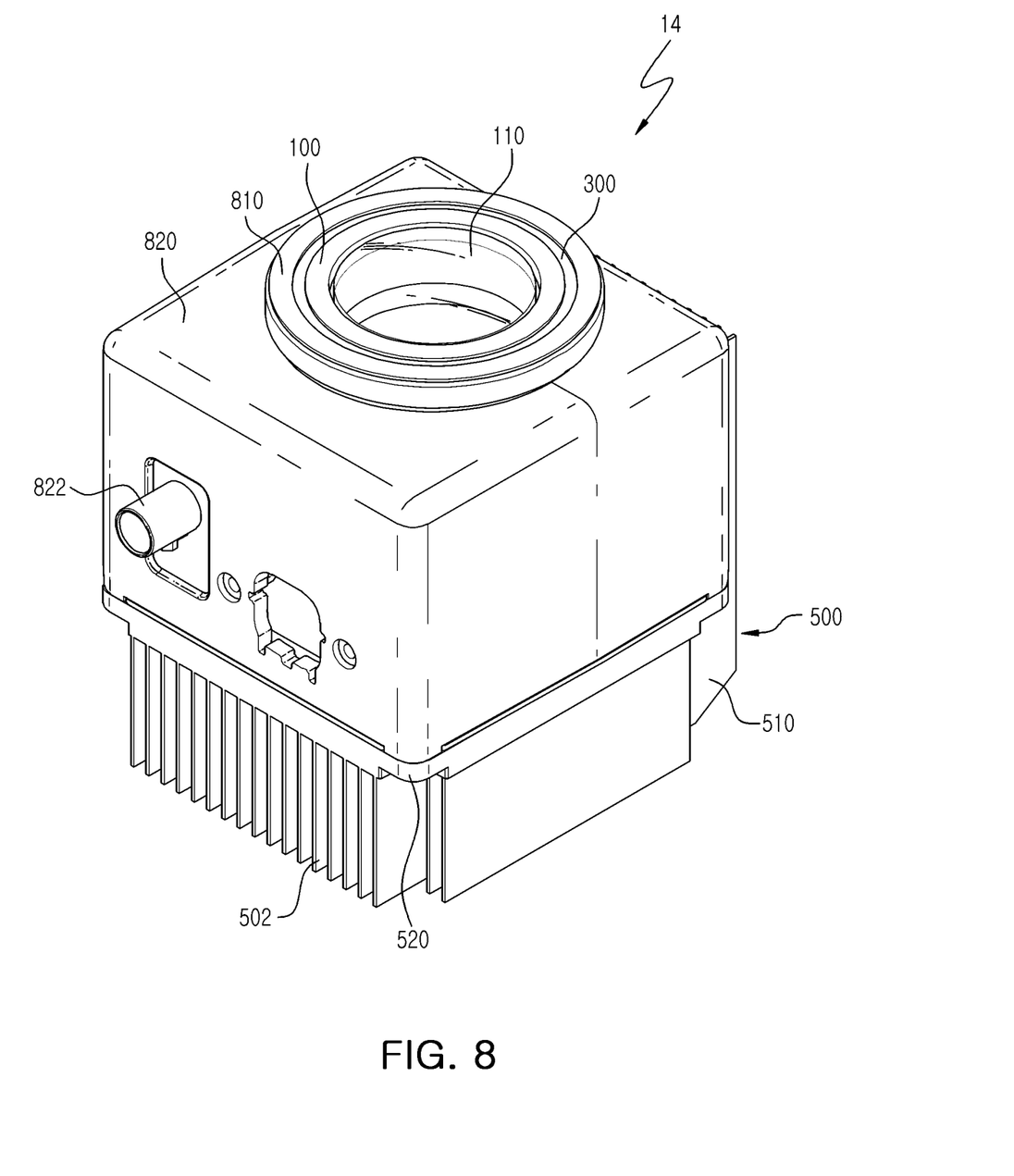
FIG. 8 is a perspective view of the camera module illustrated in FIG. 7.
Figure 9:
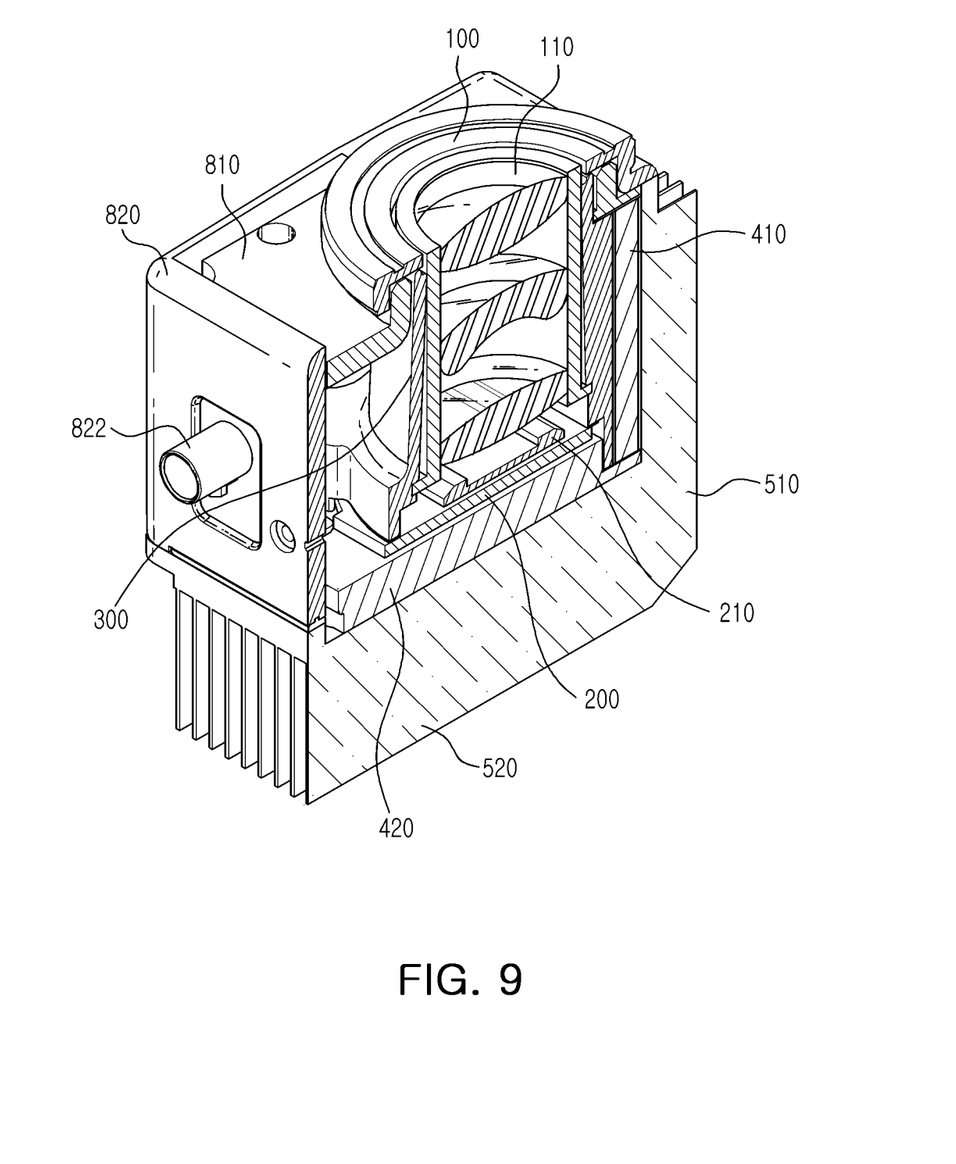
FIG. 9 is a cross-sectional view of the camera module illustrated in FIG. 8.

Next, a camera module according to another example will be described with reference to FIGS. 7 to 9.

A camera module 14 according to an example includes a lens barrel 100, a substrate 200, a housing 300, a heat transfer member 400, and a heat dissipation member 500. However, the configuration of the camera module 14 is not limited to the aforementioned members.

The lens barrel 100 is configured to receive a lens 110. For example, the lens barrel 100 may accommodate one or more lenses 110 therein. The lens barrel 100 may be configured to significantly reduce deformation thereof due to heat. For example, the lens barrel 100 may be formed of a thermosetting plastic material. However, the material of the lens barrel 100 is not limited to plastic. For example, the lens barrel 100 may be formed of a metal material.

The lens 110 is disposed inside of the lens barrel 100. For example, one or more lenses 110 may be sequentially disposed inside of the lens barrel 100 in the optical axis (C) direction. The lens 110 is configured to refract light. For example, the lens 110 may have a convex or concave shape on one surface to converge or diverge incident light. The lens 110 may be formed of a plastic material to reduce the weight of the camera module 14. However, not all lenses 110 constituting the camera module 14 are formed of a plastic material. For example, one or more lenses 110 may be formed of a glass material to significantly reduce changes in optical characteristics according to temperature changes.

The substrate 200 provides a mounting space for electronic components required for driving the camera module 14. For example, an image sensor 210 may be mounted on one surface of the substrate 200. The image sensor 210 may be configured to convert an optical signal incident through the lens 110 into an electric signal. The substrate 200 may further include electronic components required for driving the image sensor 210. For example, a passive element may be disposed on one surface or inside of the substrate 200. The substrate 200 may be configured to enable electrical connection between electronic components. For example, a circuit for electrically connecting the image sensor 210 and the passive element may be formed on one surface or inside of the substrate 200.

The housing 300 is configured to accommodate at least one of the lens barrel 100 and the substrate 200. For example, the housing 300 may accommodate a lens barrel therein. The housing 300 may be configured to absorb heat generated by the substrate 200 or the lens barrel 100 or transfer the heat externally. For example, the housing 300 may absorb heat generated by the lens barrel 100 or the substrate 200. The housing 300 may be formed of a material having high thermal conductivity to enable heat transfer. For example, the housing 300 may be formed of a metal material. However, the material of the housing 300 is not limited to a metal. One side of the housing 300 may be formed to facilitate surface contact with the first heat transfer member 410. For example, one side of the housing 300 may be formed to be substantially flat.

The camera module 14 may be overheated by an electronic component or an external environment as stated at the outset. For example, the lens barrel 100 and the housing 300 may be overheated by light rays incident through the lens 110, and the substrate 200 may be overheated by driving of an electronic component including the image sensor 210.

The camera module 14 according to this example includes the heat transfer member 400 to prevent overheating of the camera module 14 due to heat generated by the lens barrel 100, the substrate 200, and the housing 300.

The heat transfer member 400 is configured to quickly transfer heat generated by the housing 300 and the substrate 200 externally. For example, the first heat transfer member 410 may be disposed on the side of the housing 300 to transfer heat generated by the housing 300 to the first heat dissipation member 510, and the second heat transfer member 420 may be disposed below the substrate 200 to transfer heat generated by the substrate 200 directly to the second heat dissipation member 520. The first heat transfer member 410 and the second heat transfer member 420 may be firmly coupled to the housing 300 and the substrate 200 by an adhesive. The adhesive may be configured to allow heat transfer. For example, the adhesive may include a material having high thermal conductivity. As a detailed example, the adhesive may include a metal powder having high thermal conductivity, or the like.

The heat transfer member 400 (410, 420) may be formed of a material having relatively high thermal conductivity. For example, the heat transfer member 400 (410, 420) may be formed of copper, aluminum, an alloy of copper and aluminum, or the like. However, the material of the heat transfer member 400 (410, 420) is not limited to the above-described materials. The heat transfer member 400 may be configured to actively cool heat generated by the lens barrel 100, the substrate 200, and the housing 300. For example, at least one of the first heat transfer member 410 and the second heat transfer member 420 may be configured as a thermoelectric element using the Peltier effect.

The heat dissipation member 500 is configured to transmit heat of the heat transfer member 400 (410, 420) externally. For example, the heat dissipation member 500 may absorb heat of the heat transfer member 400 and discharge the heat into the air. The heat dissipation member 500 may be configured to facilitate heat dissipation. For example, the heat dissipation member 500 may be formed of a metal material. In addition, the heat dissipation member 500 may include a plurality of heat dissipation fins 502 to increase a surface area in contact with the atmosphere.

72 The heat dissipation member 500 may dissipate heat from the heat transfer members 400: 410 and 420 in different lateral directions centering on the lens 110. The heat dissipation member 500 may be divided into the first heat dissipation member 510 and the second heat dissipation member 520 based on a main radiating direction. For example, the first heat dissipation member 510 is disposed on the side of the housing 300 to contact the first heat transfer member 410, and the second heat dissipation member 520 may be disposed below the substrate 200 to be in contact with the second heat transfer member 420.

The first heat dissipation member 510 is configured to dissipate heat from the first heat transfer member 410 to one side of the camera module 14, and the second heat dissipation member 520 may be configured to dissipate heat from the second heat transfer member 420 to an other side of the camera module 14. The first heat dissipation member 510 and the second heat dissipation member 520 may be integrally formed. However, the first heat dissipation member 510 and the second heat dissipation member 520 are not necessarily integrally formed. For example, the first heat dissipation member 510 and the second heat dissipation member 520 may also be formed to be separated from each other.

The camera module 14 may further include an airtight member 700 and outer housings 810 and 820.

The airtight member 700 is configured to block moisture from penetrating into the camera module 14. For example, the airtight member 700 is configured to block a phenomenon in which moisture penetrates through a coupled portion between the substrate 200 and the housing 300. In addition, the airtight member 700 may be configured to block a phenomenon in which moisture penetrates through the coupled portion between the lens barrel 100 and the housing 300. In this example, the airtight member 700 may be respectively disposed on a coupled portion between the substrate 200 and the housing 300 and a coupled portion between the heat transfer members 410 and 420 and the heat dissipation members 510 and 520.

The outer housings 810 and 820 are configured to protect the lens barrel 100, the substrate 200, and the housing 300 from external impacts. In addition, the outer housings 810 and 820 may be configured to align the positions of the lens barrel 100, the substrate 200, and the housing 300. The outer housings 810 and 820 may be comprised of a first outer housing 810 and a second outer housing 820. The first outer housing 810 functions to align the positions of the lens barrel 100, the substrate 200, and the housing 300, and the second outer housing 820 may function to protect the lens barrel 100, the substrate 200, and the housing 300 from external shocks. A lead-out portion 822 for drawing out a connection terminal may be formed on one side of the second outer housing 820.

In the camera module 14 configured as above, since heat generated by the substrate 200 and the housing 300 is quickly discharged to the outside of the camera module 14 through the heat transfer members 410 and 420 and the heat dissipation members 510 and 520, an overheating phenomenon of the camera module 14 may be significantly reduced.

As set forth above, in a camera module according to an example, a phenomenon of resolution deterioration due to heat generation by internal components may be eliminated.

In addition, since a camera module according to an example may rapidly release heat generated by internal parts externally, high-resolution imaging and shooting may be processed with a constant quality.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens barrel configured to receive a lens;

a substrate on which an image sensor is disposed;
a housing configured to receive the lens barrel and to contact at least one surface of the substrate;
a first heat transfer member configured to contact the substrate without contacting the housing;
a second heat transfer member configured to contact the housing without contacting the substrate; and
a heat dissipation member contacting the first heat transfer member and the second heat transfer member to dissipate heat from the first heat transfer member and the second heat transfer member in different lateral directions about the lens.

2. The camera module of claim 1, wherein the housing comprises a heat dissipation unit configured to be in surface contact with the second heat transfer member.

3. The camera module of claim 1, wherein the heat dissipation member is configured to radiate heat in a direction of an optical axis of the lens and a direction perpendicular to the optical axis.

4. The camera module of claim 1, wherein the heat dissipation member comprises:
a first heat dissipation member extending in a length direction of the housing; and
a second heat dissipation member extending in a length direction of the substrate.

5. The camera module of claim 4, further comprising a heat insulating member disposed between the substrate and the second heat dissipation member.

6. The camera module of claim 1, wherein the heat dissipation member comprises:
a first heat dissipation member disposed on a first side of the housing; and
a second heat dissipation member disposed on a second side of the housing.

7. The camera module of claim 1, wherein the heat dissipation member comprises:
a first heat dissipation member disposed on a first side of the housing;
a second heat dissipation member disposed on a second side of the housing; and
a third heat dissipation member disposed on a third side of the housing.

8. The camera module of claim 1, wherein the heat dissipation member comprises one or more heat dissipation fins to increase a heat dissipation cross-sectional area.

9. The camera module of claim 1, wherein one or both of the first heat transfer member and the second heat transfer member comprises a thermoelectric element.

10. A camera module comprising:
a substrate on which an image sensor is disposed;
a lens barrel configured to receive a lens;
a housing configured to receive the lens barrel;
a first heat transfer member configured to contact the substrate without contacting the housing;
a second heat transfer member configured to contact the housing without contacting the substrate; and
a first heat dissipation member and a second heat dissipation member configured to contact the first heat transfer member and the second heat transfer member, respectively, and configured to dissipate heat from the first heat transfer member and the second heat transfer member.

11. The camera module of claim 10, wherein the first heat dissipation member and the second heat dissipation member are integrally provided.

12. The camera module of claim 10, wherein at least one of the first heat transfer member and the second heat transfer member is comprised of a thermoelectric element.

13. A camera module comprising:
a lens barrel configured to receive a lens;
a substrate on which an image sensor is disposed;
a housing configured to receive the lens barrel and in contact with at least one surface of the substrate;
a first heat transfer member configured to contact the substrate without contacting the housing;
a second heat transfer member configured to contact the housing without contacting the substrate; and
a heat dissipation member in contact with one or both of the first heat transfer member and the second heat transfer member, disposed outside of the housing and extended along at least one side surface of the housing, and configured to dissipate heat from one or both of the first heat transfer member and the second heat transfer member.

14. The camera module of claim 13, wherein the heat dissipation member comprises a first heat dissipation member extending in a first direction from the housing, and a second heat dissipation member extending in a second direction from the housing.

15. The camera module of claim 14, wherein the first direction and the second direction are different from each other.

16. The camera module of claim 15, wherein the first direction or the second direction is in an optical axis direction of the lens.

17. The camera module of claim 14, wherein the first and second heat dissipation members comprise first and second fins, respectively, extending away from the housing, and wherein the first and second fins are substantially parallel or substantially perpendicular to each other.

18. The camera module of claim 14, wherein the first and second heat dissipation members are integral with each other or separate from each other.

19. The camera module of claim 13, wherein one or both of the first heat transfer member and the second heat transfer member comprises a thermoelectric element.

* * * * *